(12) United States Patent
Russell

(10) Patent No.: US 9,314,856 B2
(45) Date of Patent: Apr. 19, 2016

(54) PRESSURE FOOT OFFSET NOSE PIECE

(71) Applicant: The Boeing Company, Chicago, IL (US)

(72) Inventor: Don S. Russell, Everett, WA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 13/934,158

(22) Filed: Jul. 2, 2013

(65) Prior Publication Data

US 2015/0010368 A1    Jan. 8, 2015

(51) Int. Cl.
*B23B 35/00* (2006.01)
*B23B 41/00* (2006.01)
*B23B 47/00* (2006.01)
*B21J 15/14* (2006.01)
*B21J 15/36* (2006.01)
*B64F 5/00* (2006.01)

(52) U.S. Cl.
CPC ............ *B23B 47/00* (2013.01); *B21J 15/142* (2013.01); *B21J 15/36* (2013.01); *B23B 35/00* (2013.01); *B23B 35/005* (2013.01); *B23B 41/00* (2013.01); *B64F 5/0009* (2013.01); *B23B 2215/04* (2013.01); *B23B 2265/12* (2013.01); *Y10T 408/03* (2015.01); *Y10T 408/561* (2015.01); *Y10T 408/5616* (2015.01)

(58) Field of Classification Search
CPC ..... B23B 2215/04; B23B 41/00; B21J 15/142
USPC .................... 29/34 B; 408/87, 88, 95, 97, 98
See application file for complete search history.

(56) References Cited

U.S. PATENT DOCUMENTS

| | | | | | |
|---|---|---|---|---|---|
| 2,466,965 | A | * | 4/1949 | Pitts | B25H 1/0057 408/99 |
| 2,844,977 | A | * | 7/1958 | Morse | B23B 49/026 324/259 |
| 4,762,261 | A | * | 8/1988 | Hawly | B21J 15/14 227/111 |
| 4,897,000 | A | * | 1/1990 | Suzuki | B23B 51/105 227/51 |
| 5,042,137 | A | * | 8/1991 | Speller, Sr. | B21J 15/10 29/524.1 |
| 5,404,641 | A | * | 4/1995 | Bratten | B23B 41/00 29/407.01 |
| 5,555,616 | A | * | 9/1996 | Michalewski | B21J 15/10 29/243.54 |
| 5,778,505 | A | * | 7/1998 | Mangus | B21J 15/10 227/51 |
| 6,134,940 | A | | 10/2000 | Banks | |
| 6,267,026 | B1 | * | 7/2001 | Yamamoto | B25B 21/00 29/798 |
| 2007/0157453 | A1 | | 7/2007 | Tomchick | |

OTHER PUBLICATIONS

Cadena, Chuck, "Boeing Begins Major Assembly of First New 777 Freighter", available from http://www.boeing.com/news/releases/2008/q1/080129e_pr.html, Jan. 29, 2008.

* cited by examiner

*Primary Examiner* — Daniel Howell
(74) *Attorney, Agent, or Firm* — Felix L. Fischer

(57) ABSTRACT

A nose piece assembly for an automated spar assembly tool incorporates a base and an engaging member. An offset member extends between the base and the engaging member. The offset member has substantially a U-shape allowing for access by the engaging member to portions of a structural assembly behind a closed angle.

12 Claims, 10 Drawing Sheets

PRESSURE FOOT OFFSET NOSE PIECE

BACKGROUND INFORMATION

1. Field

Embodiments of the disclosure relate generally to automated manufacturing system and more particularly to a drilling tool pressure foot having geometric relief for enhanced registration on fasteners behind a closed angle.

2. Background

Automated drilling systems are employed in various industries to allow rapid match drilling and assembly of large structural components. In assembly of large commercial or military aircraft, structures often require complex shaping of load bearing webs which place fasteners on the associated structural flange behind a closed angle. For effective drilling, the automated system requires a pressure foot to offset drilling forces opposite a drill foot. In prior art systems a rectangular or cylindrical pressure foot is employed attached to an automated press. Neither of these configurations may be employed with a closed angle web.

It is therefore desirable to provide a pressure foot for automated drilling which allows access behind a closed angle web.

SUMMARY

The embodiments described herein provide a nose piece assembly for an automated spar assembly tool which incorporates a base and an engaging member. An offset member extends between the base and the engaging member. The offset member has substantially a U-shape allowing for access by the engaging member to portions of a structural assembly behind a closed angle.

The nose piece assembly may be incorporated in certain embodiments in an automated drilling station for structural assemblies having a closed angle with a drilling station having a drill spindle and a bucking station for reaction of drill forces imposed by the drill spindle. The nose piece assembly mounts to the bucking station.

The embodiments provide a method for automated drilling of structural assemblies having a closed angle wherein an offset nose piece is attached to a reaction station. The offset nose piece is then positioned with the reaction station to receive a blocking structural element. A nose portion of the offset nose piece is urged into contact with a structure from which the blocking structural element extends using the reaction station to react drilling forces.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a pressure foot offset nose piece allowing automated manufacturing machines such as an Automated Spar Assembly Tool (ASAT) to reach behind closed angles parts for numerically controlled (NC) locating and drilling to automate the drilling of rows of fasteners on terminal fittings or other closed angle parts. The offset in the nose piece provides access to areas that were previously inaccessible for a straight nose piece and therefore provides a load path for the clamp or reaction force, allowing drilling from an accessible side of a structural assembly while using the offset to provide clamping force on the side with the closed angle in the structure. The disclosed embodiments expand the versatility and potential NC automation application of ASAT type machines.

Figure 1:
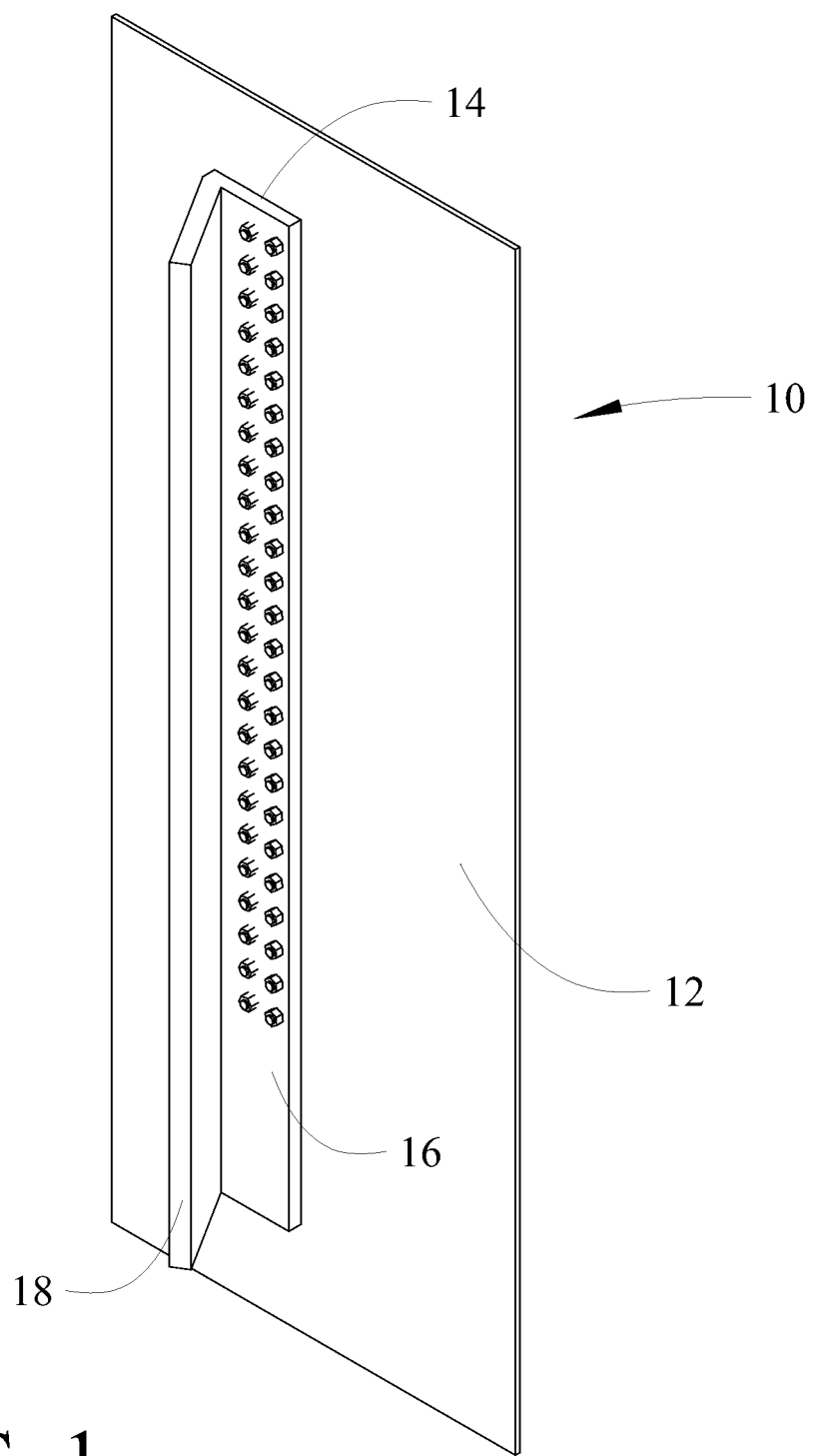
FIG. 1 is an isometric view of an aerospace structure having a spar with an attachment flange and an angled web with a closed angle relative to required fastener placement through the flange.
Figure 2:
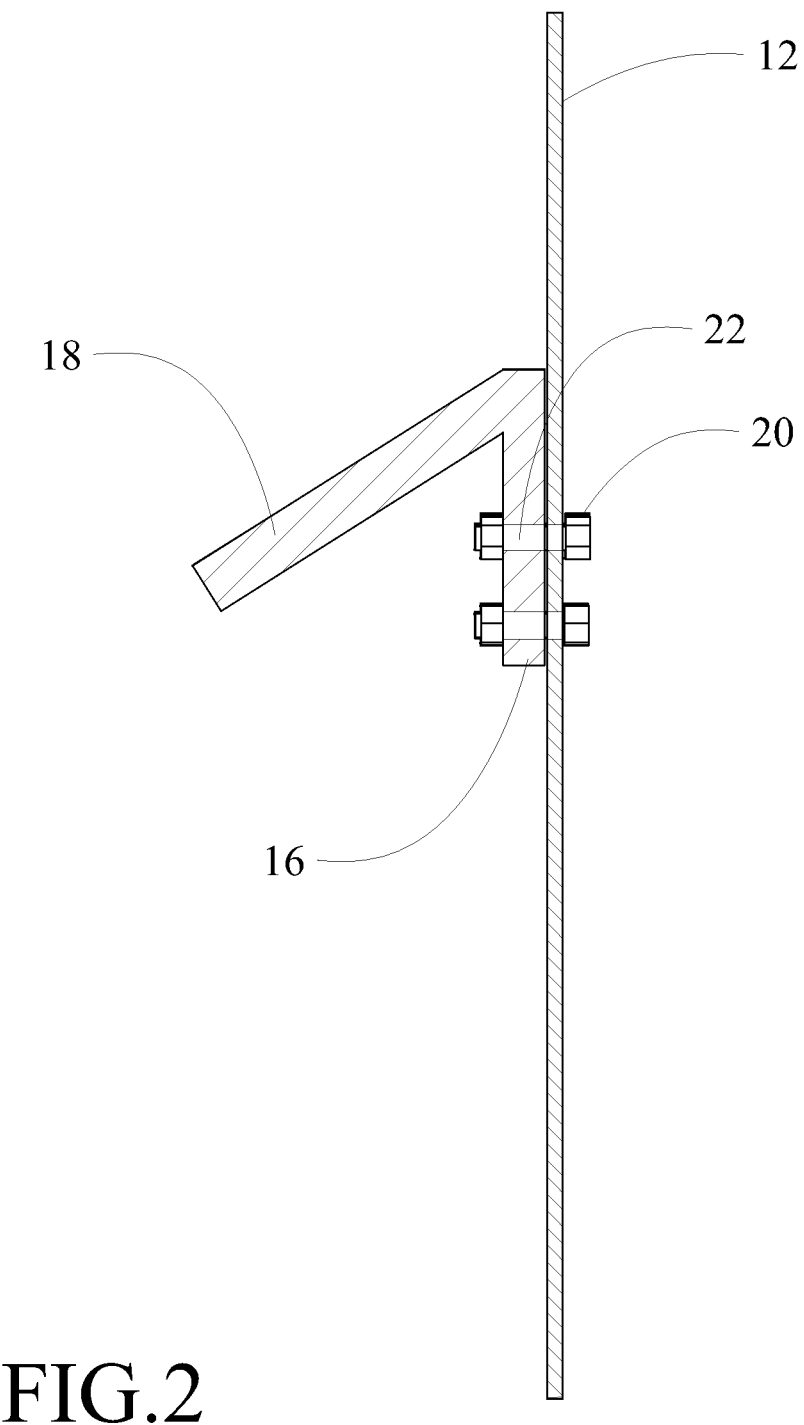
FIG. 2 is a bottom section view of the structure of FIG. 1 showing the closed angle web, flange and fastener holes.
Figure 3:
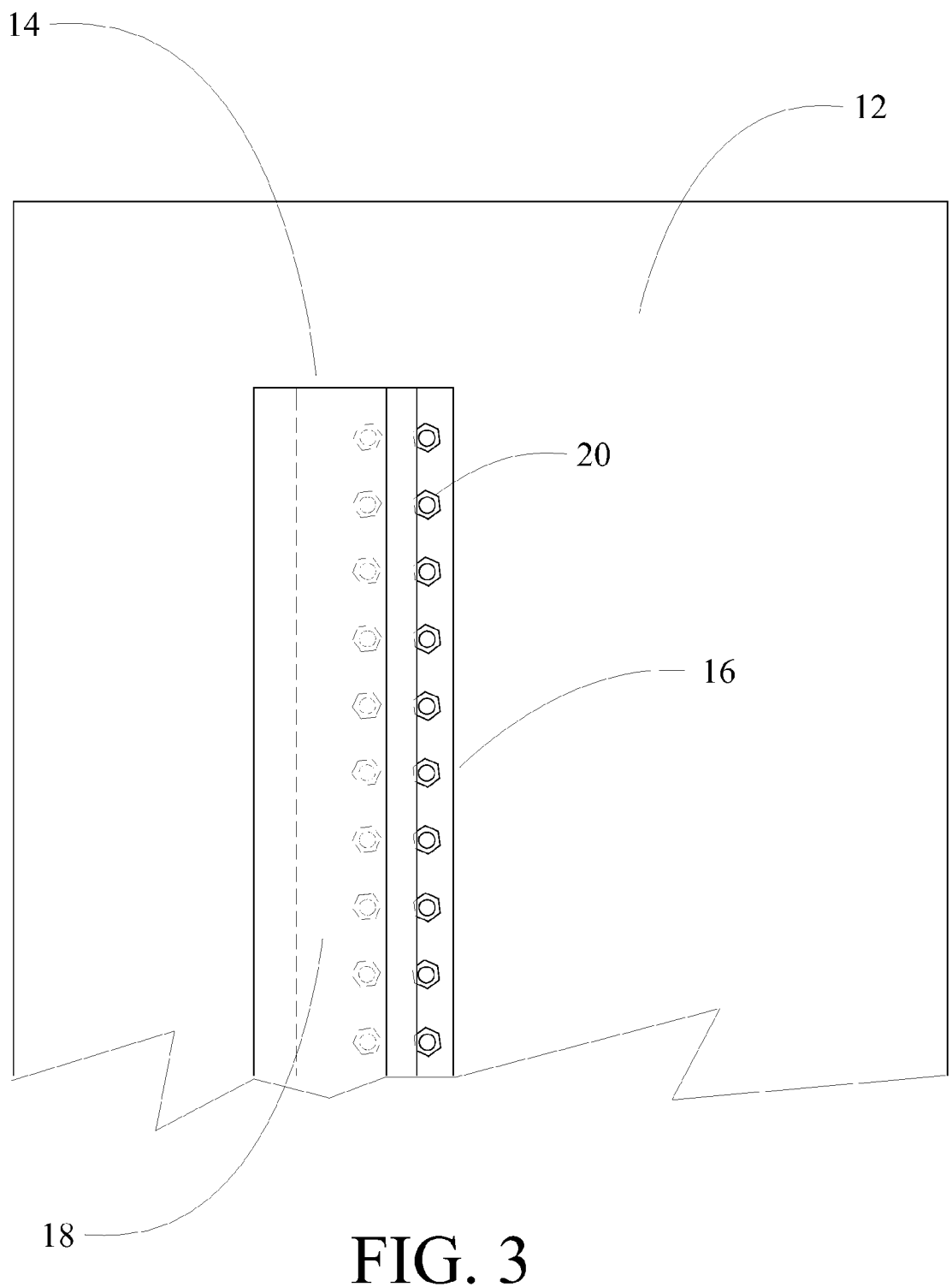
FIG. 3 is an enlarged partial front view of the structure of FIG. 1 showing the obscuration of the fastener hole locations with obscured fasteners and features shown as hidden lines.

Referring to the drawings, FIG. 1 shows an example structural assembly 10, such as a fuel tank skin and former for a large commercial aircraft. The structural assembly 10 incorporates a skin 12 and a former 14. The former 14 has a flange 16 and a web 18. The flange 16 is fastened to the skin 12 with multiple fasteners 20 extending through holes 22, as seen in FIG. 2. The flange 16 and web 18 form a closed angle which obscures the hole positions in the flange as shown in FIG. 3.

Figure 4:
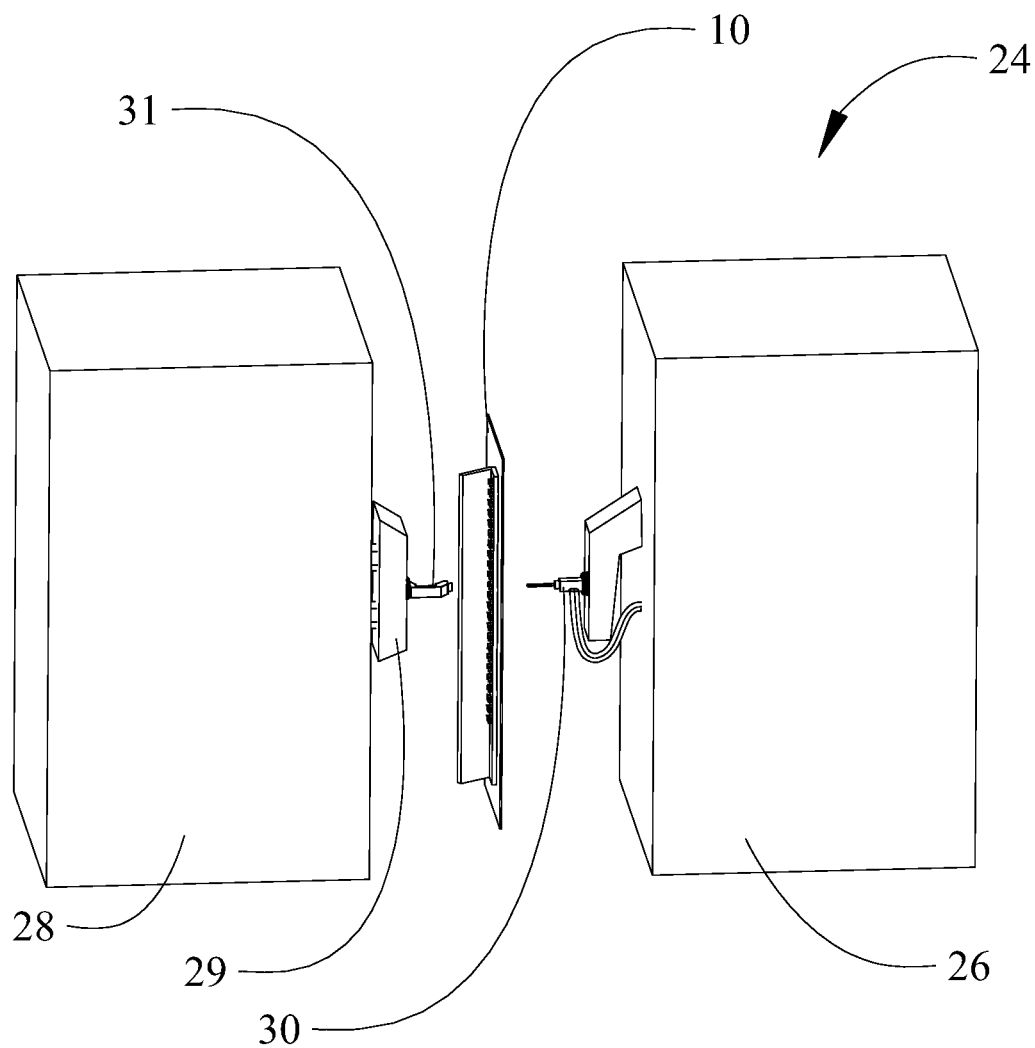
FIG. 4 is a representation of an automated drilling system having a drill section and a reaction section for structural assembly.
Figure 5:
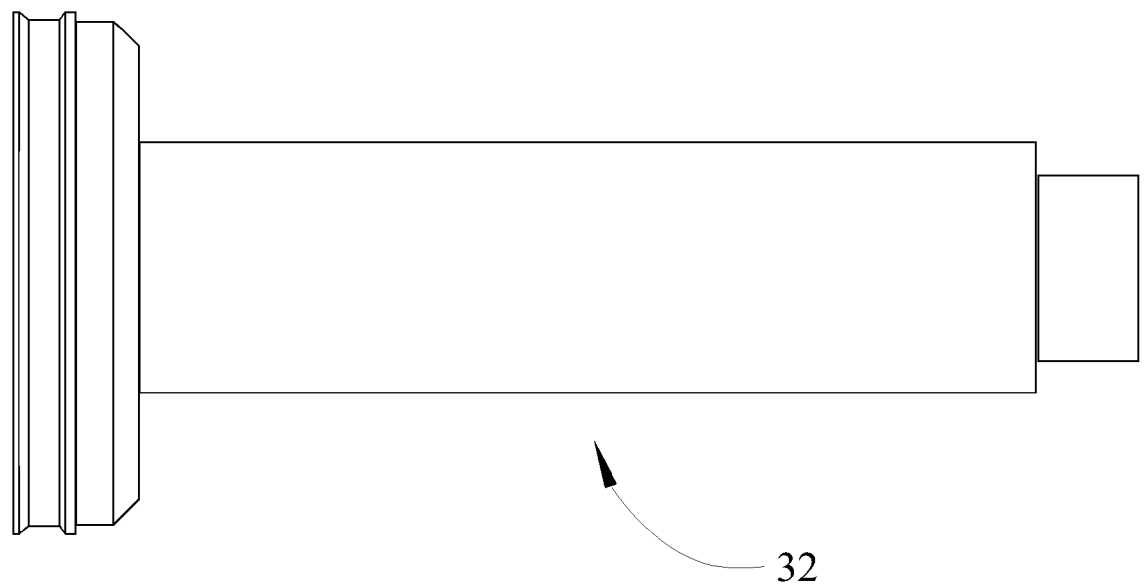
FIG. 5 is a detailed bottom view of a prior art nose piece employed with the automated drilling system of FIG. 4.
Figure 6:
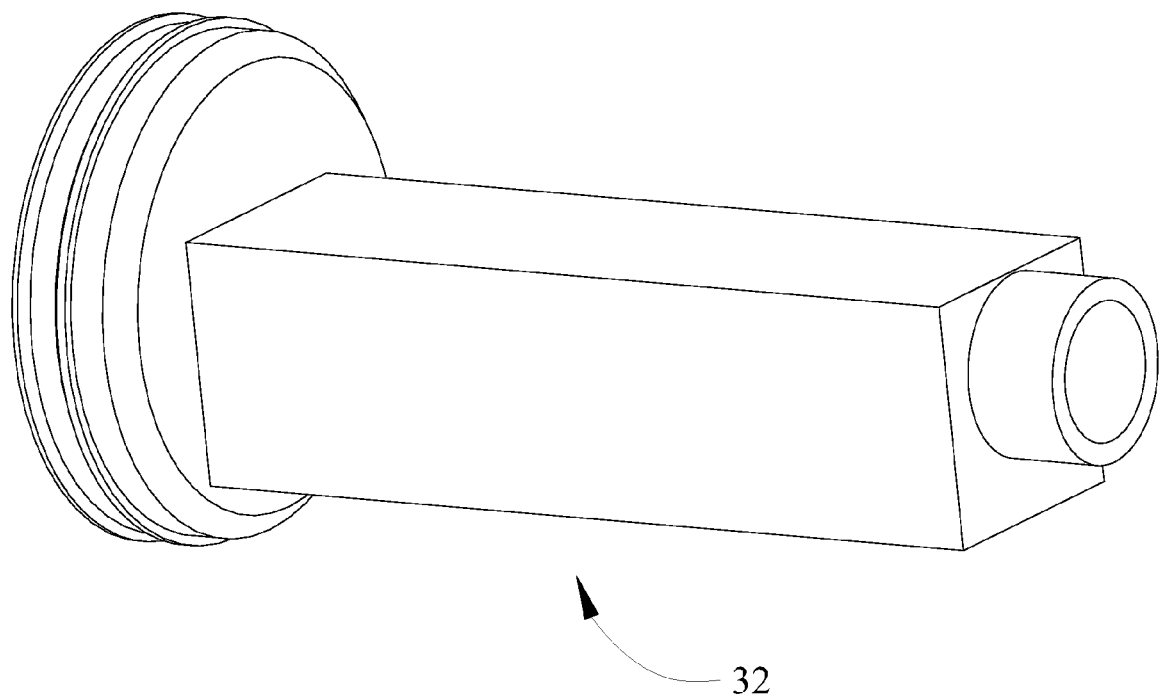
FIG. 6 is an isometric view of the prior art nose piece.

An automated drilling system 24 as shown in FIG. 4 incorporates a drilling station 26 and a bucking station 28. The example shown may be employed for drilling spar attachment holes between a wet side (internal fuel tank side of the spar) and dry side (exterior side of the spar not in contact with fuel) of a commercial aircraft wing tank assembly. The drilling station may have multiple drill spindles or heads which are extended for contact with the structural assembly 10 to be drilled, for example drill spindle 30. To prevent formation of interlaminer burs during drilling, the nose piece bucking station 28 acting on the wet side provides a reaction, clamping force equal and opposing the drill spindle 30 and the nose piece clamping force applied by the drilling station 26 acting on the dry side. Typically, a nose piece 31 extends from the reaction station 28 centered over the hole location to be drilled to provide reaction force for the drill spindle, allow for chip collection and other functions. The drilling station 26 and bucking station 28 are adapted for positioning motion under NC automated control to align the drill spindle 30 and nose piece 31 and engage the structural assembly for drilling by the drill spindle 30 and reaction of the drill forces by the nose piece 31. For a closed angle configuration such as the structural assembly 10, a straight nose piece 32, as shown in FIGS. 5 and 6 for a prior art example of a nose piece 31, cannot access the hole locations due to interference from the web 18.

Figure 7:
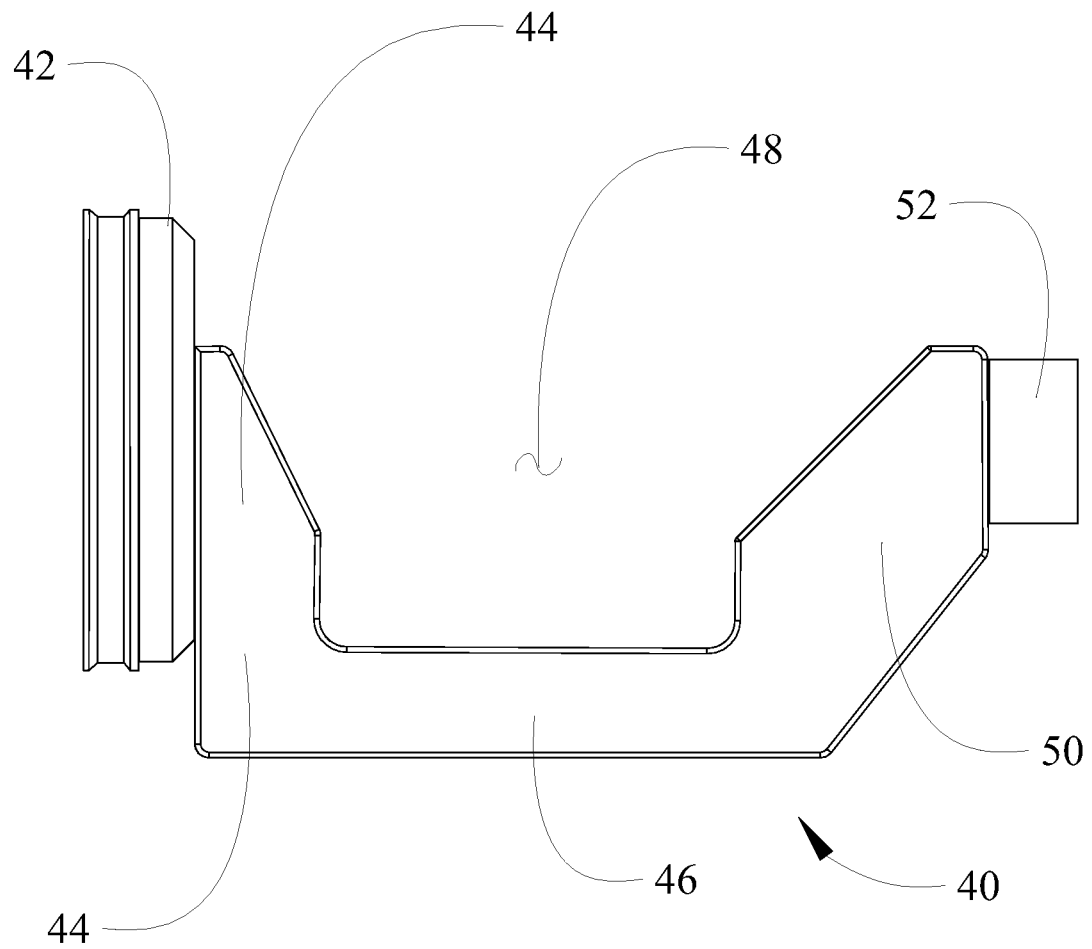
FIG. 7 is a detailed bottom view of an offset nose piece for the pressure foot of the reaction section.
Figure 8:
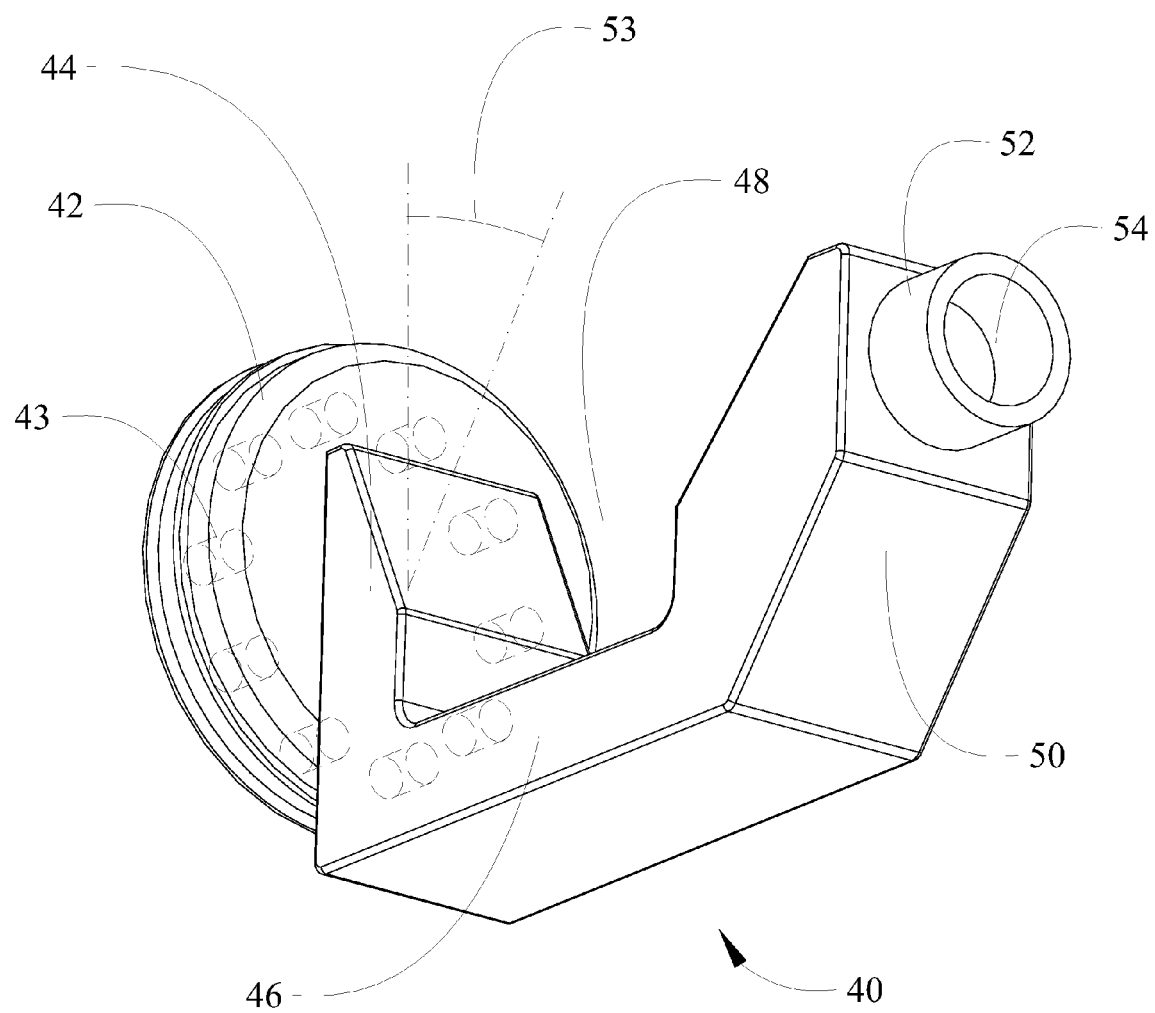
FIG. 8 is an isometric view of the offset nose piece of FIG. 7.
Figure 9:
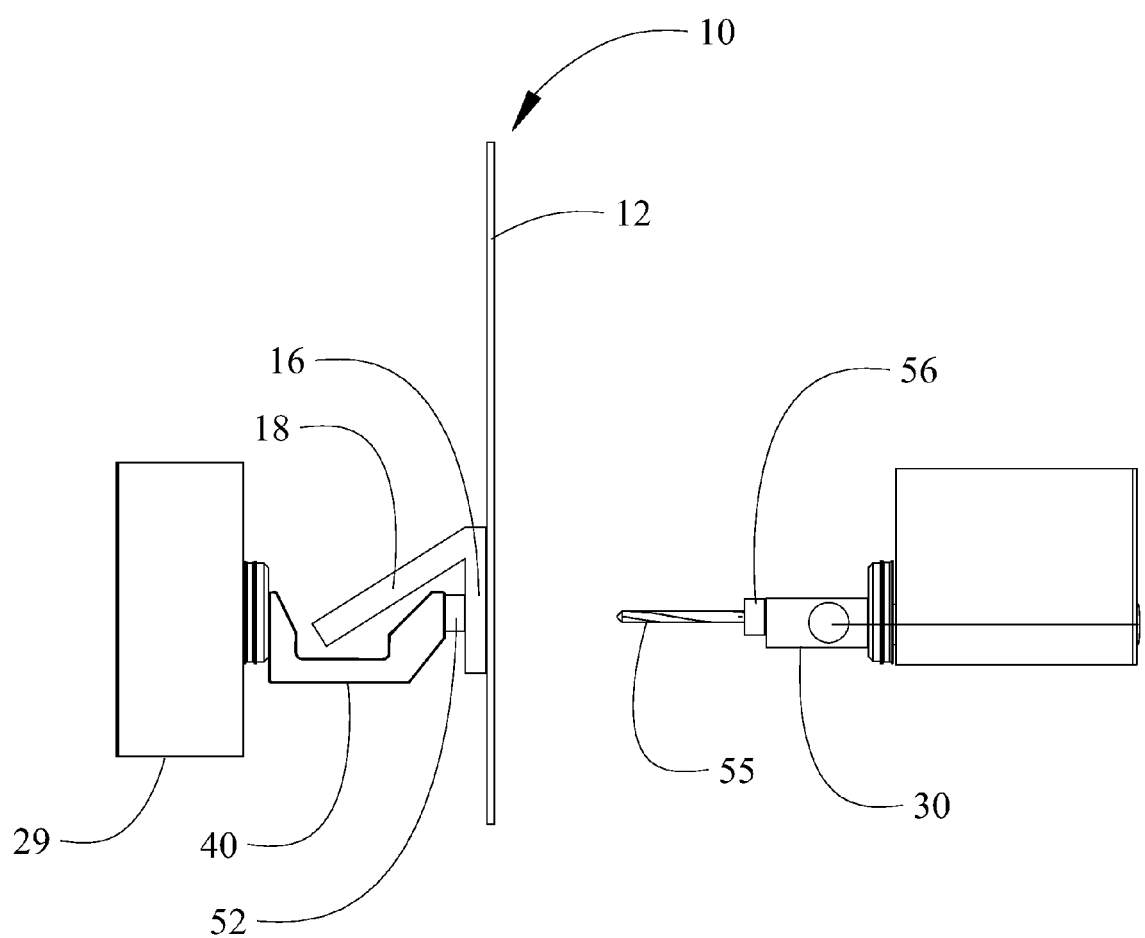
FIG. 9 is a bottom view of the offset nose piece and pressure foot as employed with the closed angle web and structure of FIG. 1; and, FIG. 10 is a flow chart of a method for employing embodiments of the offset nose piece as disclosed for providing reaction force for drilling of holes covered by a closed angle structural element.

An embodiment of the present offset configuration is shown in FIGS. 7 and 8. Offset nose piece 40 is provided for use as nose piece 31. Offset nose piece 40 incorporates a rotation flange attachment 42. Multiple rare earth magnets 43 embedded in the rotation flange attachment 42 provide for magnetic engagement to the headstone 29 (seen in FIG. 4) of bucking station 28. Magnetic attachment of the offset nose piece 40 to the headstone allows "breakaway" capability if the bucking station 28 brings the nose piece into forcible lateral contact with a portion of the structure. A body 44 extends from the rotation flange 42 with an offset angled portion 46 providing a relief 48 into which the web 18 can extend allowing a nose portion 50 to which a pressure nose 52 is attached to access the locations for holes 22 to provide reaction pressure for the drill spindle as shown in FIG. 9. For the embodiment shown, the body 44, offset angled portion 46 and nose portion 50 of the offset nose piece 40 create a substantially U or C shape to receive the Rotation flange 42 allows the orientation of offset angled portion 46 of the offset nose piece 40 to be positioned by the bucking station 28 to accept a closed angle flange from any desired direction (represented by angle 53). The pressure nose 52 is substantially cylindrical with a bore 54 through which the drill bit is received. The combination of the pressure nose 52 as an engaging member for the structure and the offset angled portion 46 as an angled member to accommodate the structural element creating the blind hole condition allows automated operation for drilling. In FIG. 9, the drill 55 is shown extended through the spindle side pressure nose 56 as an example, however, in normal operation, the drill would not extend until the flange 16 and skin 12 of work piece 10 were clamped between pressure nose 52 and pressure nose 56.

Figure 10:
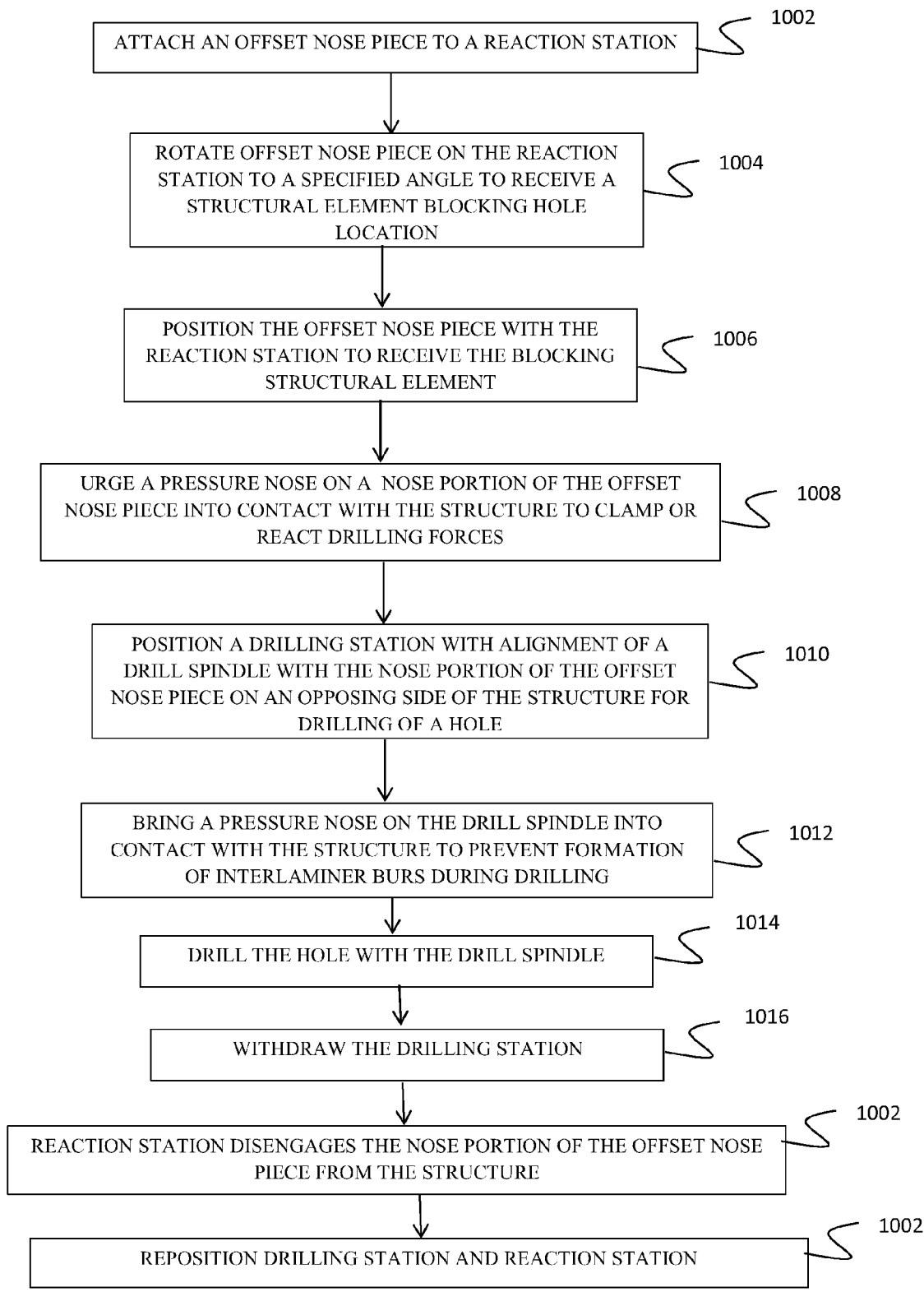

As shown in FIG. 10 the present embodiments may be employed to drill holes in a closed angle structure by attaching an offset nose piece to a reaction station, step 1002. The offset nose piece is then rotated on the reaction station to a specified angle to receive a structural element blocking hole location, step 1004. The reaction station then positions the offset nose piece to receive the blocking structural element, step 1006. The reaction station then urges a pressure nose on a nose portion of the offset nose piece into contact with the structure to clamp or react drilling forces, step 1008. A drilling station is then positioned with alignment of a drill spindle with the nose portion of the offset nose piece on an opposing side of the structure for drilling of a hole, step 1010. A pressure nose on the drill spindle is brought into contact with the structure to prevent formation of interlaminer burs during drilling, step 1012. The holed is then drilled, step 1014. The drilling station is then withdrawn, step 1016 and the reaction station disengages the nose portion of the offset nose piece from the structure, step 1018. The drilling station and reaction station are then repositioned, step 1020 for the next hole location and the process resumes at step 1004, 1006 or 1008 as appropriate for the location.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A nose piece assembly for an automated spar assembly tool comprising:
    a base;
    an engaging member;
    an offset member extending between said base and said engaging member, said offset member having substantially a U-shape allowing for access by said engaging member to portions of a structural assembly behind a closed angle;
    a rotation flange extending from the base for attachment to a bucking station; and,
    a plurality of magnets embedded in the rotation flange for attachment to a headstone on the bucking station.

2. The nose piece assembly as defined in claim 1 wherein the engaging member comprises a pressure nose adapted to engage a flange for reaction pressure to a drill spindle.

3. The nose piece assembly as defined in claim 2 wherein the pressure nose has a cylindrical cavity to receive a protruding drill from the drill spindle upon piercing the flange.

4. An automated drilling system for structural assemblies having a closed angle comprising:
    a drilling station having a drill spindle;
    a bucking station reaction of drill forces imposed by the drill spindle, said bucking station including a nose piece having
    a base;
    an engaging member; and
    an offset member extending between said base and said engaging member, said offset member having substantially a U-shape allowing for access by said engaging member to portions of a structural assembly behind a closed angle;
    a rotation flange extending from the base for attachment to a bucking station; and,
    a plurality of magnets embedded in the rotation flange for attachment to a headstone on the bucking station.

5. The automated drilling system as defined in claim 4 wherein the engaging member comprises a pressure nose adapted to engage a flange for reaction pressure to a drill spindle.

6. The automated drilling system as defined in claim 5 wherein the pressure nose has a cylindrical cavity to receive a protruding drill from the drill spindle upon piercing the flange.

7. A method for automated drilling of structural assemblies having a closed angle comprising:
    attaching an offset nose piece having a rotation flange with a plurality of magnets to a headstone on a reaction station by magnetic attraction;
    positioning the offset nose piece with the reaction station to receive a blocking structural element; and,
    urging a nose portion of the offset nose piece into contact with a structure from which the blocking structural element extends using the reaction station to react drilling forces.

8. The method of claim 7 further comprising:
    positioning a drilling station with alignment of a drill spindle with the nose portion of the offset nose piece on an opposing side of the structure for drilling of a hole; and
    drilling the hole.

9. The method of claim 8 further comprising:
    withdrawing the drilling station; and,
    using the reaction station, disengaging the nose portion of the offset nose piece.

10. The method claim 9 further comprising:
    repositioning the drilling station and reaction station for the next hole location.

11. The method of claim 7 further comprising rotating the offset nose on the reaction station to a specified angle to receive the structural element the blocking hole location.

12. The method of claim 8 further comprising engaging a pressure nose on the drill spindle with the structure to prevent interlaminar burrs.

\* \* \* \* \*